US012645483B2

(12) United States Patent
Nie et al.

(10) Patent No.: US 12,645,483 B2
(45) Date of Patent: Jun. 2, 2026

(54) APPLICATION CHAOS INJECTION FOR IMPROVED SYSTEM RESILIENCE

(71) Applicant: Omnissa, LLC, Mountain View, CA (US)

(72) Inventors: Bomin Nie, Beijing (CN); Sam Zhao, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 544 days.

(21) Appl. No.: 18/129,682

(22) Filed: Mar. 31, 2023

(65) Prior Publication Data

US 2024/0231878 A1     Jul. 11, 2024

(30) Foreign Application Priority Data

Jan. 6, 2023     (WO) ................ PCT/CN2023/070876

(51) Int. Cl.
 *G06F 9/455*          (2018.01)
(52) U.S. Cl.
 CPC .. *G06F 9/45558* (2013.01); *G06F 2009/4557* (2013.01); *G06F 2009/45583* (2013.01)
(58) Field of Classification Search
 None
 See application file for complete search history.

(56) References Cited

U.S. PATENT DOCUMENTS

| | | | | |
|---|---|---|---|---|
| 8,966,318 B1 * | 2/2015 | Shah | .................. | G06F 11/3698 |
| | | | | 714/28 |
| 11,163,669 B1 * | 11/2021 | Torun | .................. | G06F 11/3676 |
| 11,593,172 B2 * | 2/2023 | Rosoff | ............... | G06F 9/45558 |
| 11,847,046 B1 * | 12/2023 | Ayyadurai | .......... | G06F 11/3684 |
| 2021/0263836 A1 * | 8/2021 | Singh | .................. | G06F 11/3698 |

* cited by examiner

*Primary Examiner* — Wynuel S Aquino
(74) *Attorney, Agent, or Firm* — Kim & Stewart LLP

(57) ABSTRACT

Systems and methods are described for injecting chaos into an application based on a determination that network traffic will be at the application when the chaos is injected. In an example, a gateway can receive requests for applications in a system. The gateway can be configured to periodically insert a header into an application request that causes a proxy agent associated with the requested application to request chaos instructions from a server. When chaos instructions are requested, the server can determine whether and what kind of chaos to inject into the application. The server can send instructions to the proxy agent, which can inject chaos according to the instructions. A monitoring agent can then monitor traffic around the application to determine whether other applications and system components behave appropriately in response to the injected chaos.

17 Claims, 4 Drawing Sheets

APPLICATION CHAOS INJECTION FOR IMPROVED SYSTEM RESILIENCE

BACKGROUND

Cloud computing has become a preferred platform for application deployment, particularly for enterprise organizations. Cloud-based applications must be resilient to glitches and faults that may occur. Otherwise, customers may search for alternative providers. To address this, chaos engineering has emerged as a discipline of experimenting on a distributed system to induce artificial failures to build confidence in the system's capability to withstand turbulent conditions in production. Some examples of chaos engineering platforms include CHAOS MONKEY and VMWARE's MANGLE.

Current chaos engineering platforms experiment on a system by randomly injecting chaos into the system. This can include, for example, terminating an application, manufacturing latency, and exhausting a computing resource, such as processor, memory, or disk usage. Randomly injecting chaos is inefficient and often ineffective because chaos is often injected into idle components of a system. System resiliency cannot be measured when there is no network traffic passing through the component being tested.

As a result, a need exists for more efficient methods of injecting chaos into a system.

SUMMARY

Examples described herein include systems and methods for injecting chaos into an application based on a determination that network traffic will be at the application when the chaos is injected. In an example, applications in a system can have a proxy agent that acts as a middleman between the application and devices accessing the application. For example, a user can request access to an application from a user device. If the application is hosted in a cloud platform, the application can be accessed through a web browser. The user can input a uniform resource locator ("URL") associated with the application into a web browser, either directly or by selecting a hypertext link or application icon, and the web browser can make a hypertext transfer protocol secure ("HTTPS") call with the URL. The HTTPS call can be routed to a gateway for the system. The gateway can receive application requests for the system and route the requests to the proxy agent of the requested application.

The gateway can be configured with rules that regulate how often chaos is injected into applications in the system. This can limit the impact of system resiliency tests in a production environment. The gateway can do this by inserting a header into an application access request, and the header can indicate to the proxy agent whether the proxy agent should request chaos instructions from a server. The rate that headers cause the proxy agent to request chaos instructions can vary, such as one out of every 100 or 1,000 requests. In an example, the rate can be set by an administrator ("admin") using an admin console.

After injecting a header, the gateway can send the request to the corresponding proxy agent. If the header indicates that the proxy agent should not request chaos instructions, the proxy agent can pass the request to the application. If the header indicates that the proxy agent should make the request, then the proxy agent can send a request for chaos instructions to a server. The server can include a service that processes the request, which is referred to hereinafter as an "orchestrator." The orchestrator can determine when to inject chaos into an application and what type of chaos should be injected. For example, the orchestrator can determine whether the application should be terminated, latency should be manufactured, or a computing resource should be manipulated. This can be based on a configuration file provided by an admin. For example, the configuration file can indicate what type of chaos to inject and any additional information about the chaos. For example, if the chaos type is for manufacturing latency, then the configuration file can indicate how much latency, such as six seconds. If the chaos type is manipulating a computing resource, the configuration file can indicate how much manipulation. For example, the computing resource can be manipulated to a usage rate of 75% or 100%.

In some examples, the configuration file can include a probability factor that the orchestrator uses to calculate whether to provide instructions to create chaos. As an example, a probability factor of 0.3 can cause the orchestrator to send instructions for implementing the chaos 30% of the time. In one example, the type of chaos injected can be specific to the requested application, which can be identified based on an identifier provided by the proxy agent. Alternatively, the orchestrator can select a chaos type either randomly or based on weighted values that cause some chaos types to be selected more than others.

The orchestrator can send the chaos instructions to the proxy agent, which can in turn inject the chaos into the application. A monitoring agent can monitor neighboring components to determine whether they behave appropriately. If network traffic reaches a first application, the monitoring agent can begin monitoring a second application that it knows will attempt to communicate with the first application. For example, if the second application cannot reach the first application, it can be configured to retry after a certain amount of time or report that it cannot communicate with the first application. If the second application does not behave as configured, the monitoring agent can notify an admin.

In some examples, the chaos can be injected into an application or service that is not the application being requested. For example, in responding to an application request, a first application will communicate with a second application or other service. Instead of injecting the chaos into the first application, the chaos can be injected into the second application or other service that the system knows the first application will attempt to communicate with. The monitoring agent can then monitor the first application's response to the injected chaos.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for injecting chaos into an application based on a determination that network traffic will be at the application when the chaos is injected. In an example, a gateway can receive requests for applications in a system. The gateway can be configured to periodically insert a header into an application request that causes a proxy agent associated with the requested application to request chaos instructions from a server. When chaos instructions are requested, the server can determine whether and what kind of chaos to inject into the application. The server can send instructions to the proxy agent, which can inject chaos according to the instructions. A monitoring agent can then monitor traffic around the application to determine whether other applications and system components behave appropriately in response to the injected chaos.

Figure 1:
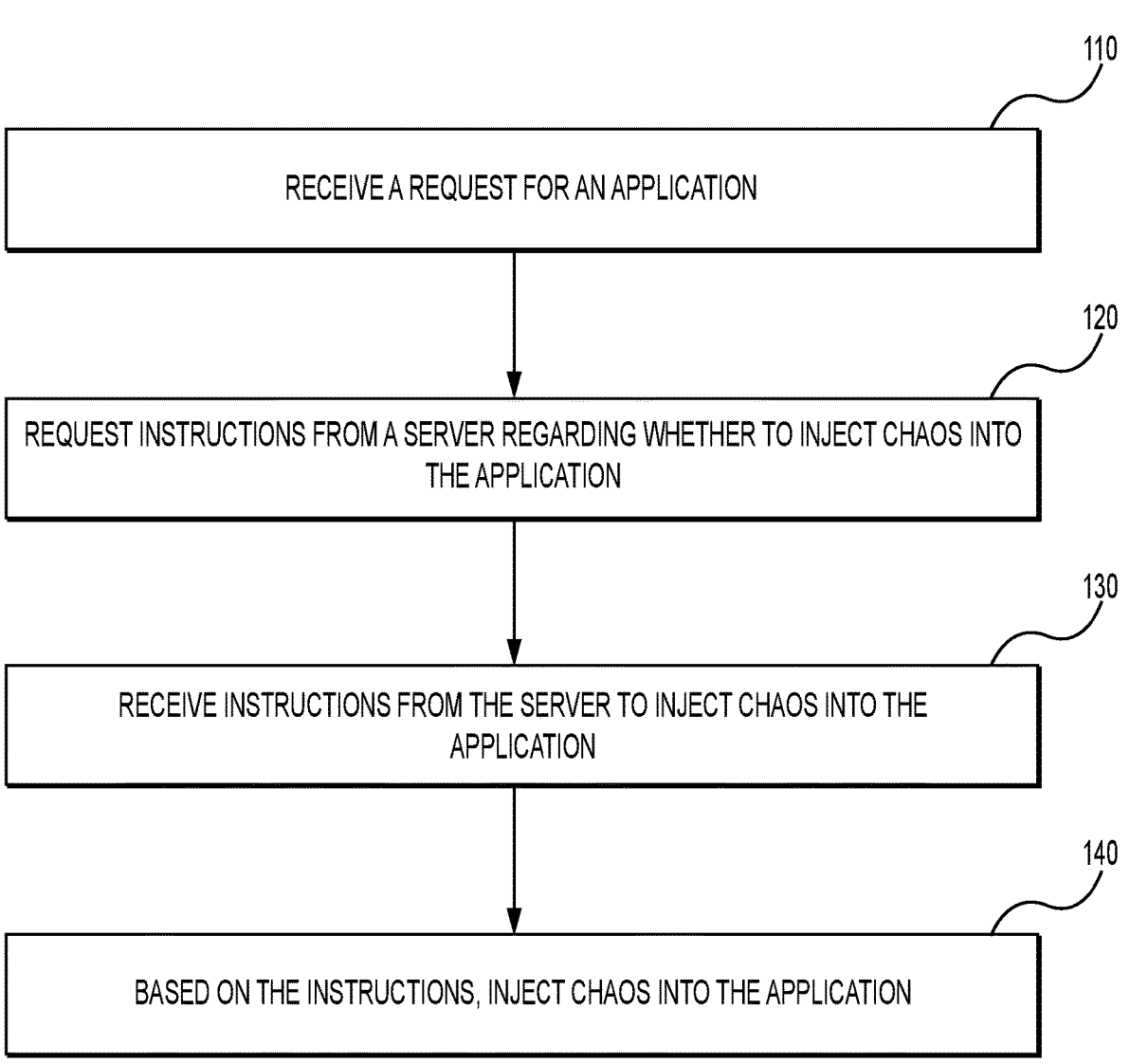
FIG. 1 is a flowchart of an example method for injecting chaos into an application.

FIG. 1 is a flowchart of an example method for injecting chaos into an application. At stage 110, a proxy agent can receive a request for an application. The application can be any software or service that performs a specific task for an end user or another application or service. The proxy agent can be a network element that acts as a middleman between an application managed by a system and devices attempting to use the application. Requests to use or access an application can be routed through the application's proxy agent. In an example, each application in a system can be assigned a proxy agent. Some systems utilize cluster orchestration systems that deploy containerized applications, such as Kubernetes. Although references are made herein to Kubernetes, those references are merely used as examples and are not intended to be limiting in any way. For example, Kubernetes can encompass any cluster orchestration system, such as OPENSHIFT, HASICORP NOMAD, and RANCHER. In a Kubernetes cluster, applications are deployed in containers called "pods." A pod is a group of one or more containers with shared storage and network resources, and a specification for how to run the containers. In Kubernetes systems, proxy agents can be inserted into the pods to act as a management middleman for application instances in the pod. Proxy agents can also be deployed in non-containerized systems where each application is assigned its own proxy agent.

The proxy agent for an application can be used to determine when network traffic is passing through a particular application so that the resiliency of the associated system can be tested at that application. For example, at stage 120, when the proxy agent receives an application request, the proxy agent can request instructions from a server regarding whether to inject chaos into the application. By requesting these instructions in response to an application request, the system knows that there will be network traffic at the proxy's corresponding application.

The proxy agents can be configured to request chaos instructions for some requests but allow others to pass through directly to the application. This can limit interruptions for users in a production environment. A determination regarding which requests to pass through directly can be made before the proxy agent requests instructions from the server. This can reduce the network traffic load that the server must handle. In an example, all application requests can be routed through a gateway. A gateway can be a device or node (physical or virtual) that allows data to flow from one discrete network to another. The gateway can receive application requests for multiple applications and route the requests to their respective proxy agents. The gateway can be configured to insert a header into each request that indicates whether the proxy agent should request chaos instructions for the server. As an example, if a request should be passed directly to the application, the gateway can insert a header that reads "chaos=false." When a proxy agent should request chaos instructions, the gateway can insert a header that reads "chaos=true."

The header insertion can be done based on a set of rules, which can be application specific. For example, for one application, the gateway can be configured to insert the chaos=true header into one out of every 100 requests. For another application, the gateway can be configured to insert the chaos=true header into one out of every 1,000 requests. The rate at which requests are selected for chaos injection requests can be set by an admin using an admin console. This allows system resiliency to be tested in a production environment while limiting the number of users that are affected by the testing.

The server that receives the request for chaos instructions can include an orchestrator service that processes the request. The orchestrator can determine when to inject chaos into an application and what type of chaos should be injected. In an example, the orchestrator can do this using a configuration file. An example of such a configuration file is provided in Table 1 below.

TABLE 1

```
{
   "appSelection": "named", // Use "random" for random application
   selection.
   "apps": [
      {
         "app": "app1",
         "chaos": {
            "type": "app-crash",
            "value": "",
            "chance": 0.3 // chaos is injected for 3 traffics out of 10
         }
      },
      {
         "app": "app2",
         "chaos": {
            "type": "app-latency",
            "value": "6", // 6 seconds
            "chance": 0.5
         }
      }
   ]
}
```

In the example configuration file above, "appSelection" determines whether chaos injection is random or based on application requests. The example configuration file has the input "named" after "appSelection," which indicates that the orchestrator should input the application's name or identifier ("ID") into ensuing script to determine whether to inject chaos and what kind of chaos to inject. As shown in Table 1, if "named" is replaced with "random," then the orchestrator will inject chaos randomly. When "appSelection" is set to "named," the orchestrator can match the request to a chaos script in the configuration file for the corresponding application, which is indicated by "app." The configuration file includes chaos scripts for two applications: app1 and app2. When the proxy agent for app1 sends a chaos injection request, the orchestrator can execute the chaos script under "app": "app1" and likewise for app2 the orchestrator can execute the chaos script under "app": "app2."

Each chaos script includes a "type," "value," and "chance" field. The "type" value indicates the type of chaos to be injected. For example, the chaos script for app1 has a "type" value of "app-crash," which means the proxy agent should terminate app1. The chaos script for app2 has a "type" value of "app-latency," which means the proxy agent should cause app2 to delay it responses. The "value" field can specify a value depending on the "type" field. For example, no value is needed for an "app-crash" chaos, so the "value" field for app1 does not have a value. On the other hand, the "value" field for an "app-latency" chaos type can indicate the latency length that should be generated. In Table 1, the value of "6" in the "value" field for app2 means that app2 will create a 6 second latency. The "chance" field indicates the probability that the chaos will be injected. The "chance" values are between zero and 1 and represent a percentage. For example, the "chance" value for app1 is 0.3, meaning that the orchestrator will respond to 30% of chaos instruction requests for app1 with instructions to crash app1. The "chance" value for app2 is 0.5, meaning that the orchestrator will respond to 50% of chaos instruction requests for app2 with instructions to generate 6 second latency at app2. The orchestrator can respond to all other requests with instructions to not inject any chaos.

Chaos configurations can be provided by an admin console. An admin console can be an interface that allows an admin to create and modify chaos configurations. For example, using the admin console, an admin can select which applications to inject chaos into, what kind of chaos to inject, and how often the chaos is injected. The admin console can send a data file with the configuration settings to the server where they can be implemented by the orchestrator. The admin console can also allow an admin to configure how often proxy agents for an application request chaos instructions. This configuration can be implemented by reconfiguring the gateways to modify how often they inject a chaos=true header into an application, for example.

At stage 130, the proxy agent can receive instructions from the server to inject chaos into the application. In an example, the orchestrator can send the instructions as a datafile, such as a JAVASCRIPT Object Notation ("JSON") file. The instructions can indicate whether to inject the chaos, what kind of chaos to inject, and any additional instructions related to the chaos injection. For example, using the example configuration file from Table 1, for app1 the instructions can indicate that the proxy agent should crash the application. For app2 the instructions can indicate that the proxy agent should create six seconds of latency at the application.

At stage 140, the proxy agent can inject chaos into the application based on the instructions. Injecting chaos can include performing any action, according to the instructions, that potentially causes the application to malfunction in some way. For example, the proxy agent can terminate the application, generate latency, or exhaust a computing resource, such as by maximizing the processor, memory, or disk usage for the application.

In an example, the server can include a monitoring service that monitors system performance in response to the injected chaos. For example, the monitoring service can include, or have access to, information relating to how different applications and services in the system communicate with each other. As an example, the information can indicate what other applications communicate with the application requesting chaos instructions. The monitoring service can leverage this information to activate monitoring at an application or service that the monitoring service knows will attempt to reach the application with the injected chaos. For example, chaos can be injected into a first application. The orchestrator can notify the monitoring service that chaos is being injected at the first application. The monitoring service can identify a second application that will attempt to communicate with the first application and begin monitoring the second application to determine whether it responds appropriately to the chaos injected at the first application. As an example, the second application can be configured to reattempt to communicate with the first application at predetermined intervals when the second application does not get a response from the first application. The monitoring service can monitor the second application to determine whether it reattempts to communicate at the correct intervals. In another example, the second application can be configured to reroute communication to a different pod or application if the first application does not respond, and the monitoring service can determine whether the second application follows this protocol.

The monitoring service can send instructions to the second application for monitoring. For example, the monitoring service can send instructions that cause the second application, or the corresponding proxy agent, to log events related to the monitoring and send the logs to the monitoring service. As an example, the second application, or its proxy agent, can log when the second application reattempts communication with the first application and when it attempts to reach an alternate application.

In some examples, the application injected with chaos can be different from the application that received the initial request. As an example, when the proxy agent of a first application sends a chaos injection request to the server, the orchestrator can identify a second application that the first application will communicate with when the first application responds to the initial request. The orchestrator can send the chaos injection instructions to the second application, and the proxy agent of the first application can cause the first application to respond to the initial request. The monitoring service can monitor the behavior of the first application in response to the chaos injected at the second application.

The examples of system monitoring described herein are not meant to be limiting in any way. The monitoring service can be configured to monitor any configuration setting in the system. In an additional example relating to Kubernetes clusters, a ReplicaSet can manage pods for a Kubernetes cluster. When an application or pod in a cluster is injected with chaos, the monitoring service can monitor the corresponding ReplicaSet's behavior. For example, the monitoring service can determine whether the ReplicaSet attempts to initiate or reboot the affected application or creates another pod or application instance to replace the affected application.

The monitoring service can log monitoring events. This can include events where components of the system act as expected and events where they do not. The monitoring service can notify an admin when a component does not respond properly to a chaos injection. For example, the monitoring service can send a notification or a message to an admin console. The notification or message can include the logs and any information relevant to the improper behavior.

Figure 2:
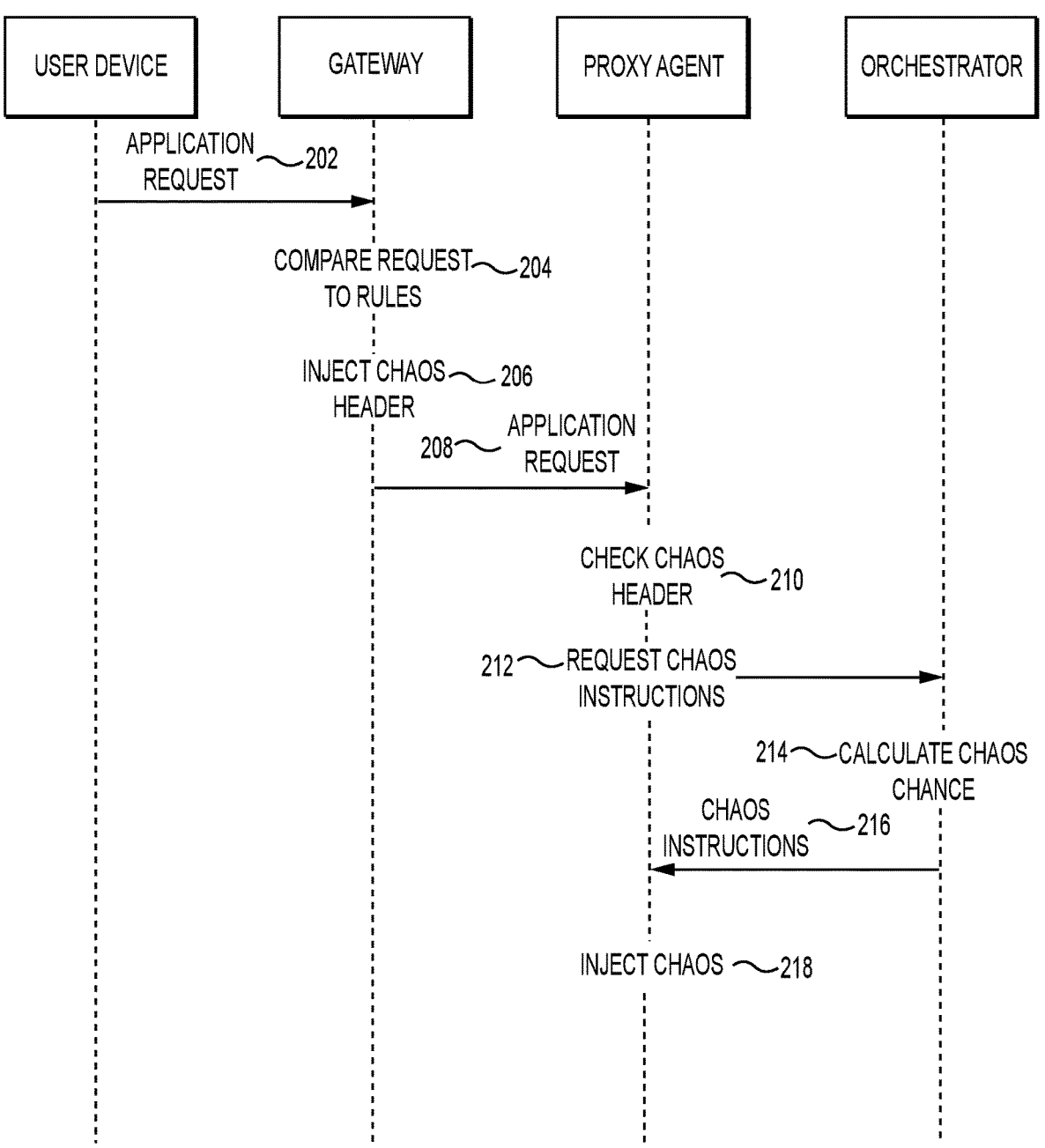
FIG. 2 is a sequence diagram of an example method for injecting chaos into an application.

FIG. 2 is a sequence diagram of an example method for injecting chaos into an application. At stage 202, a user device can request access to an application. The request can be a request to access or use the application. For example, the application can be a software-as-a-service ("SaaS") application that is accessible over the Internet. A user can request the application by entering an associated URL into a web browser. The web browser can send a HTTPS request with the URL that routes to a gateway. The gateway can receive application requests for multiple applications and route the requests to a proxy agent for the requested application.

At stage 204, the gateway can compare the request to a set of rules associated with the application. For example, the gateway can receive application requests for multiple applications and route the requests to their respective proxy agents. Whenever a request is received, the gateway can insert a header that indicates whether the application's proxy agent should request chaos instructions for the server. The rules can dictate how often the gateway inserts a header for requesting chaos instructions, such as once every 100 or 1,000 requests.

At stage 206, the gateway can inject the chaos header into the application request. As an example, if a request should be passed directly to the application, the gateway can insert a header that reads "chaos=false." When a proxy agent should request chaos instructions, the gateway can insert a header that reads "chaos=true." The rate at which the gateway inserts a "chaos=true" header can be set by an admin using an admin console. This allows the admin to manage how often users are affected by the test when testing in a production environment. At stage 208, the gateway can send the application request with the chaos header to a proxy agent associated with the application.

At stage 210, the proxy agent can check the chaos header. Using the example chaos header described above, if the chaos header reads "chaos=false," then the proxy agent can pass the request to the application without injecting chaos or requesting further instructions from the server. If the chaos header reads "chaos=true," then, at stage 212, the proxy agent can request chaos instructions from the orchestrator. The proxy agent can send the request using any available communication protocol, such as an HTTPS call or an Application Programming Interface ("API") call.

At stage 214, the orchestrator can calculate a chance for injecting chaos. The orchestrator can do this using chaos configuration settings for the application. These settings can be provided by an admin through an admin console. The settings can indicate what type of chaos to inject for the corresponding application, any additional information about the chaos type, and a probability that the chaos will be injected. Using the example chaos configuration file in Table 1 as an example, each application can have a "chance" field corresponding to the probability that chaos will be injected. The orchestrator can calculate whether to send instructions for injecting chaos using the "chance" value. In one example, each time chaos instructions are requested, the orchestrator can input the chance value for the application into an algorithm that outputs whether to inject chaos based on the "chance" value. In some alternate examples, stage 214 can be skipped. For example, the orchestrator can simply respond with chaos injection instructions for every request.

At stage 216, the orchestrator can send chaos instructions to the proxy agent. The content of the chaos instructions can depend on the configuration settings for the application. For example, some types of chaos that can be injected can include terminating the application, manufacturing latency, or exhausting a computing resource, such as by maximizing the processor, memory, or disk usage for the application. In one example, the configuration settings for an application can indicate which chaos type to inject. Using the configuration file in Table 1 as an example, the chaos type for app1 is terminating the application and the chaos type for app2 is manufacturing latency. In an alternate example, the orchestrator can determine which type of chaos to inject. For example, the orchestrator can randomly select a chaos type to inject. Alternatively, the configuration settings for an application can include a probability for multiple chaos types, and the orchestrator can calculate which chaos type to inject based on the probabilities.

At stage 218, the proxy agent can inject the chaos into the application. Injecting chaos can include performing any action, according to the instructions, that causes the application to malfunction in some way. For example, the proxy agent can terminate the application, generate latency, or exhaust a computing resource, such as by maximizing the processor, memory, or disk usage for the application.

Figure 3:
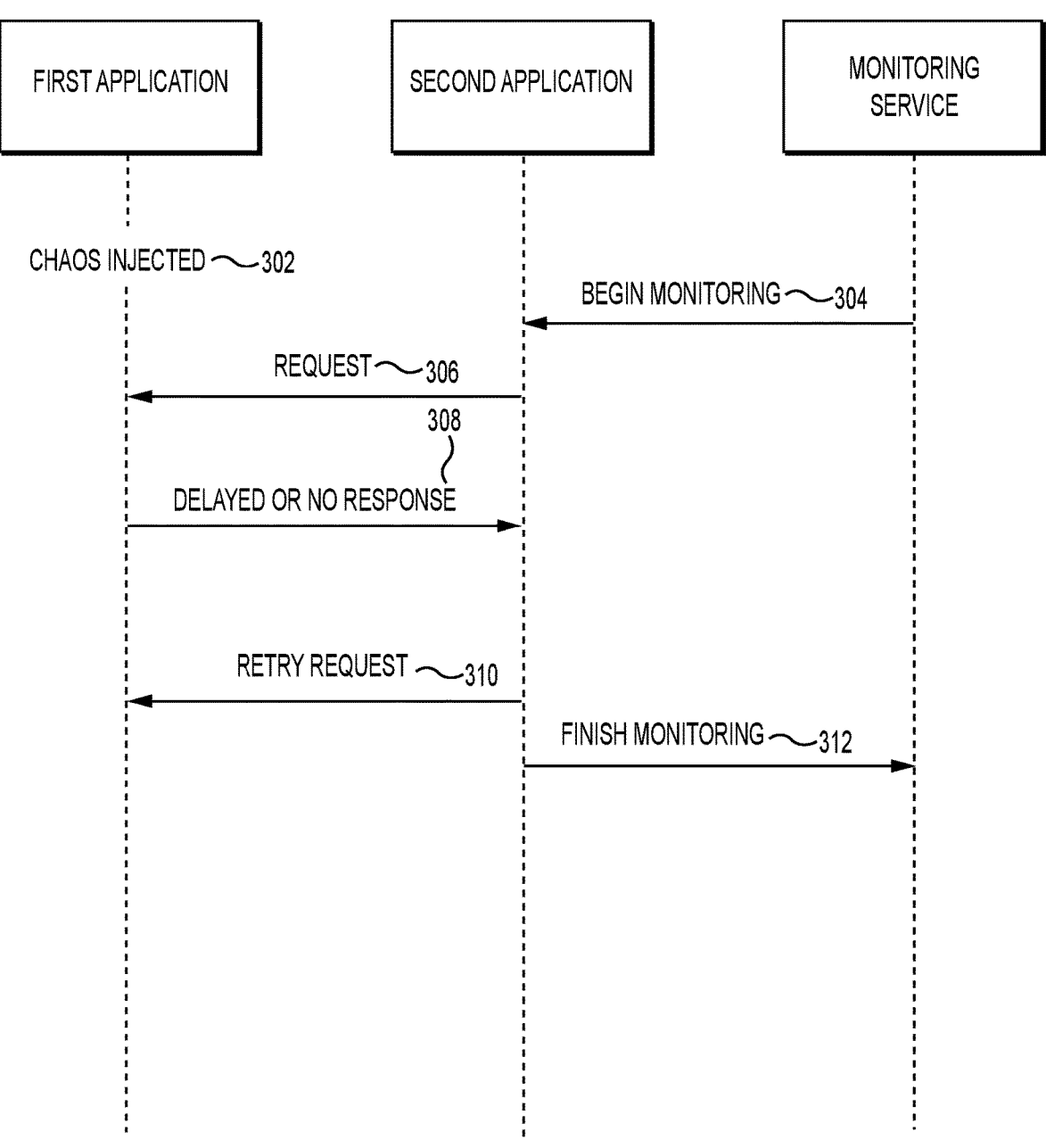
FIG. 3 is a sequence diagram of another example method for injecting chaos into an application.

FIG. 3 is a sequence diagram of another example method for injecting chaos into an application that includes stages for monitoring a system's response to injected chaos. The following method can be a continuation of the example method from FIG. 2. For example, stage 302 can occur after stage 218 of FIG. 2. Accordingly, the proxy agent described in FIG. 2 can be the proxy agent for the first application described below, and the second application described below can be another application or service in the system.

At stage 302, the chaos can be injected into the first application. For example, the proxy agent of the first application can inject the chaos or provide instructions to the application for injecting the chaos. As an example, the proxy agent can crash the application or provide instructions for shutting down. In another example, the proxy agent can cause the application to delay responding to requests for a predetermined amount of time. In another example, the proxy agent can cause a computing resource for the application to spike.

At stage 304, a monitoring service can begin monitoring the second application. The monitoring service can be responsible for monitoring system performance in response to injected chaos. The monitoring service can include, or have access to, information relating to how different applications and services in the system communicate with each other. For example, the monitoring service can access a data table that stores information about which application or services will call each other after a user requests an application or service. The monitoring service can use the information to know where network traffic will be so that the network traffic can be tested. For example, the data table can indicate that, after a request is received for the first application, the second application will attempt to communicate with the first application. Alternatively, the data table can indicate that the first application will first contact the second application to perform a certain function, and then the second application will execute the function and respond to the first application. In such an example, the proxy agent can inject the chaos after the first application contacts the second application but before the second application replies. The monitoring service can monitor the second application to determine how the second application responds to the chaos injected at the first application.

In some examples, the application injected with chaos can be different from the application that received the initial request. As an example, the user device can request the second application, and the orchestrator can determine to inject chaos in response to the request. Instead of injecting chaos at the second application, the orchestrator can use the data table to determine that the second application will contact the first application in response to the user request. Based on that determination, the orchestrator can inject the chaos at the first application, and the monitoring service can begin monitoring the second application.

Monitoring the second application can include collecting logs of actions performed by the second application. For example, the monitoring service can send instructions to the second application to begin sending logs to the monitoring service. Alternatively, a monitoring agent can be installed in the application that retrieves relevant logs and sends them to the monitoring service. In a Kubernetes environment, such a monitoring agent can be installed in the pods. In one example, the application's proxy agent can act as a monitoring agent.

At stage 306, the second application can send a request to the first application. The request can be any kind of communication between the applications. As some examples, the second application can send instructions or information, request that the first application execute a function, or request information from the first application.

At stage 308, the first application can provide a delayed response or no response at all. For example, if the chaos terminated the first application, then the second application will get no response. If the chaos manufactured a delay or spiked a computing resource, then the second application may get a delayed response.

At stage 310, the second application can retry the request. For example, the second application can be configured to attempt to reach the first application again after a predetermined amount of time. Although stage 310 describes the second application retrying the request, this is merely an example. The second application can perform any preconfigured action based on the first application's response. For example, if the second application cannot reach the first application, the second application can be configured to attempt to reach an alternate application or report that it cannot reach the first application.

In some examples, the monitoring service can monitor other components of the system. As an example, in a Kubernetes environment, a ReplicaSet can be responsible for detecting when an application in a pod crashes or has latency issues and performing actions to restore the application, such as by restarting the application or launching another instance of the application. The monitoring service can monitor the ReplicaSet and determine whether it responds appropriately to the injected chaos.

At stage 312, when monitoring is complete, the monitoring service can finish monitoring. The monitoring service can be configured to perform certain actions when a system component does not behave as configured. The monitoring service can notify an admin when a component does not respond properly to a chaos injection. For example, the monitoring service can send a notification or a message to an admin console. The notification or message can include the logs and any information relevant to the improper behavior.

Figure 4:
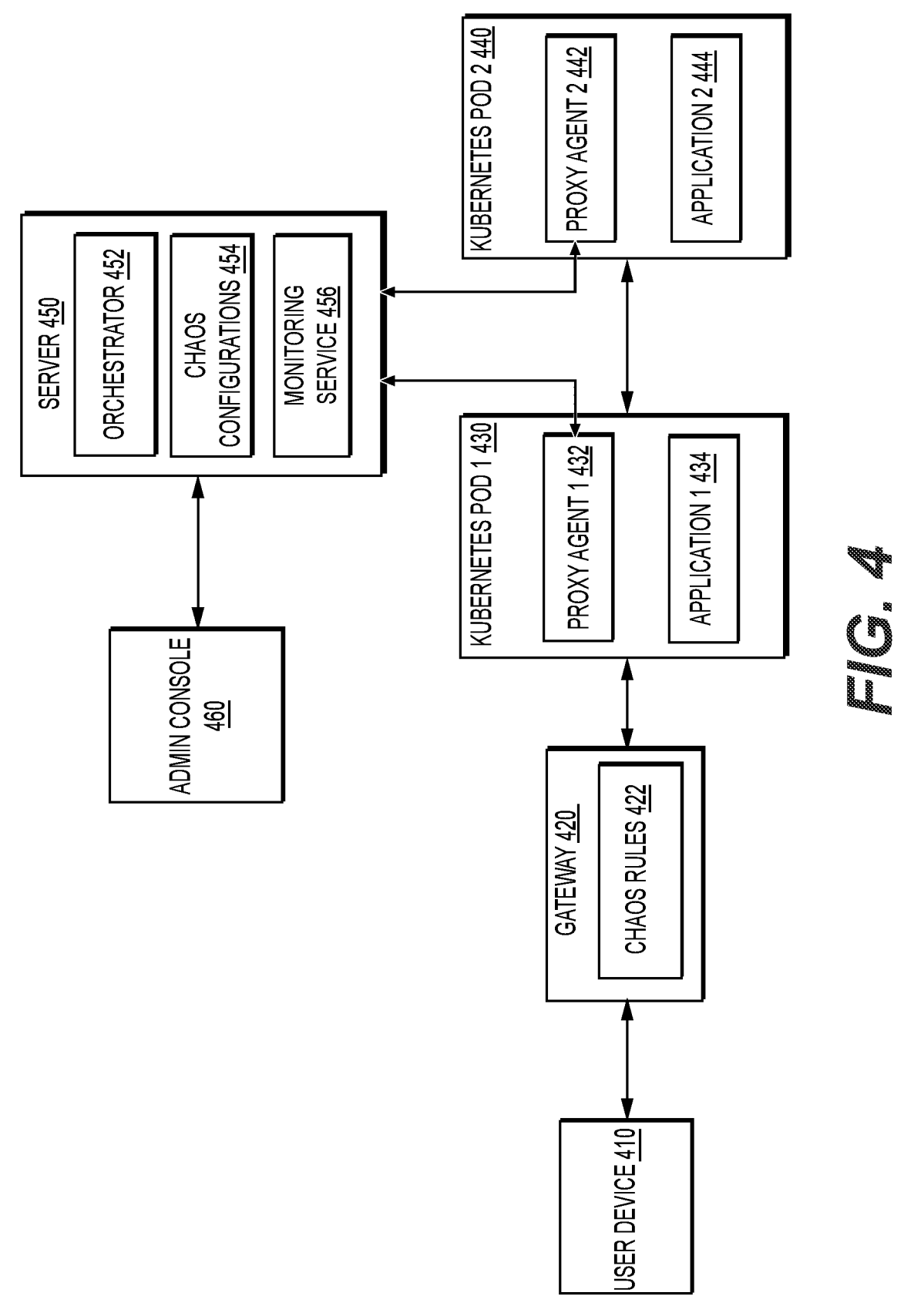
FIG. 4 is an illustration of an example system for performing injecting chaos into an application.

FIG. 4 is an illustration of an example system for injecting chaos into an application. The system can include a user device 410. The user device 410 can be one or more processor-based devices, such as a personal computer, tablet, or cell phone. A user can access applications for a system from the user device 410, such as application 1 434 and application 2 444. The applications 1 434 and 2 444 can be web-based. For example, the applications 1 434 and 2 444 can be hosted by a webserver, and a user can access the applications 1 434 and 2 444 through a web browser. The user device 110 can make an HTTPS request using a URL associated with the corresponding application.

Application requests can be received at a gateway 420. The gateway 420 can be a device or node (physical or virtual) that allows data to flow from one discrete network to another. The gateway 420 can be configured to insert a header into each request that indicates whether a proxy agent for the requested application should request chaos instructions for the server. The headers can be injected based on chaos rules 422. The chaos rules 422 can designate how often the gateway 420 should insert a header for requesting chaos instructions based on the application being requested.

After inserting the header, the gateway 420 can forward the request to the application's proxy agent. For example, each application in the system can be assigned a proxy agent that acts as a middleman between its application and the user device 410. For example, the proxy agent 1 432 is assigned to the application 1 434 and the proxy agent 2 442 is assigned to the application 2 444.

Optionally, the applications 1 434 and 2 444 can be deployed in a Kubernetes cluster. For example, as shown, the application 1 434 and the proxy agent 1 432 are part of the Kubernetes pod 1 430, and the application 2 444 and the proxy agent 2 442 are part of the Kubernetes pod 2 440. The Kubernetes pods 1 430 and 2 440 can be managed by a ReplicaSet (not shown).

The proxy agents 1 432 and 2 442 can communicate with a server 450 to retrieve chaos instructions. For example, if the proxy agent 1 432 receives an application request with a header indicating that chaos instructions should be requested, then the proxy agent 1 432 can send such a request to the server 450. The server 450 can be a single server or a group of servers, including multiple servers implemented virtually across multiple computing platforms. For example, a server can be an operating system ("OS") running on a single computing device or one or more virtual machines ("VMs") running in a cloud-based environment. The proxy agents 1 432 and 2 442 can send requests for chaos instructions using any available communication protocol, such as an HTTPS call or API call.

The server 450 can include an orchestrator 452, which can be a service that determines when to inject chaos into an application and what type of chaos to inject. The orchestrator can make this determination based on chaos configurations 454. The chaos configurations 454 can include chaos configuration settings for each application managed by the system, such as what type of chaos to inject, values associated with the chaos injection, and a probability value that can be used to determine whether or not to inject chaos.

The chaos configurations 454 can be provided by an admin using an admin console 460. The admin console 460 can be an interface that allows an admin to create and modify chaos configurations 454. For example, using the admin console 460, an admin can select which applications to inject chaos into, what kind of chaos to inject, and how often the chaos is injected. The admin console 460 can send the chaos configurations as a data file, such as a JSON file. The admin console 460 can also allow an admin to configure how often the proxy agents 1 432 and 2 442 request chaos instructions.

The server 450 can include a monitoring service 456 that monitors components of the system in response to chaos being injected. For example, if chaos is injected into the application 1 434, then the monitoring agent can monitor how the application 2 444 responds, and vice versa. The monitoring agent can also monitor how the Kubernetes pod 1 430 responds to chaos injected at the application 1 434. In some examples, a monitoring agent (not shown) can be installed in the Kubernetes pods 1 430 and 2 440. The monitoring agents can monitor components in their corresponding Kubernetes pods and send the results to the monitoring service 456. The monitoring service 456 can be configured to notify an admin when a system component does not respond properly to injected chaos, such as by sending a notification or message to the admin console 460.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for injecting chaos into an application, comprising:

receiving, at a gateway device from a user device, an access request for a first application;

inserting, by the gateway device and according to chaos rules associated with the first application, a header into the access request indicating whether a proxy agent for the first application is to request chaos instructions;

forwarding, by the gateway device, the access request including the header to the proxy agent associated with the first application;

at the proxy agent, responsive to determining from the header that the proxy agent is to request the chaos instructions, sending, to a server, a request requesting instructions from the server regarding whether to inject chaos into the first application, wherein the server reads configuration data associating the first application with a chaos type and a chance value representing a probability that chaos is to be injected, and wherein the server determines, based on the chance value, whether to provide the instructions indicating injection of chaos for the access request;

at the proxy agent, receiving instructions from the server to inject chaos of the chaos type into the first application; and at the proxy agent and based on the instructions, injecting the chaos of the chaos type into the first application.

2. The method of claim 1, wherein injecting chaos into the first application includes at least one of terminating the first application, generating latency at the first application, and increasing utilization of a computing resource for the first application.

3. The method of claim 1, further comprising:

monitoring a second application to determine whether the second application responds as expected to the chaos injected at the first application; and in an instance where the second application does not respond as expected, generating a notification.

4. The method of claim 3, wherein the second application is monitored based on a determination that the second application will attempt to contact the first application in response to the access request being granted.

5. The method of claim 3, wherein monitoring the second application includes determining whether the second application reattempts to communicate with the first application after a predetermined amount of time.

6. The method of claim 1, further comprising:

monitoring a Kubernetes pod that hosts the first application to determine whether the Kubernetes pod attempts to restart the first application; and in an instance where the Kubernetes pod does not attempt to restart the first application, generating a notification.

7. A non-transitory, computer-readable medium containing instructions that, when executed by a hardware-based processor, causes the processor to perform stages for injecting chaos into an application, the stages comprising:

receiving, at a gateway device from a user device, an access request for a first application;

inserting, by the gateway device and according to chaos rules associated with the first application, a header into the access request indicating whether a proxy agent for the first application is to request chaos instructions;

forwarding, by the gateway device, the access request including the header to the proxy agent associated with the first application;

at the proxy agent, responsive to determining from the header that the proxy agent is to request the chaos instructions, sending, to a server, a request requesting instructions from the server regarding whether to inject chaos into the first application, wherein the server reads configuration data associating the first application with a chaos type and a chance value representing a probability that chaos is to be injected, and wherein the server determines, based on the chance value, whether to provide the instructions indicating injection of chaos for the request;

at the proxy agent, receiving the instructions from the server to inject the chaos of the chaos type into the first application; and at the proxy agent, based on the instructions, injecting the chaos of the chaos type into the first application.

8. The non-transitory, computer-readable medium of claim 7, wherein injecting chaos into the first application includes at least one of terminating the first application, generating latency at the first application, and increasing utilization of a computing resource for the first application.

9. The non-transitory, computer-readable medium of claim 7, the stages further comprising:

monitoring a second application to determine whether the second application responds as expected to the chaos injected at the first application; and in an instance where the second application does not respond as expected, generating a notification.

10. The non-transitory, computer-readable medium of claim 9, wherein the second application is monitored based on a determination that the second application will attempt to contact the first application in response to the access request being granted.

11. The non-transitory, computer-readable medium of claim 9, wherein monitoring the second application includes determining whether the second application reattempts to communicate with the first application after a predetermined amount of time.

12. The non-transitory, computer-readable medium of claim 7, the stages further comprising:

monitoring a Kubernetes pod that hosts the first application to determine whether the Kubernetes pod attempts to restart the first application; and in an instance where the Kubernetes pod does not attempt to restart the first application, generating a notification.

13. A system for injecting chaos into an application, comprising:

a memory storage including a non-transitory, computer-readable medium comprising instructions; and a hardware-based processor that executes the instructions to carry out stages comprising:

receiving, at a gateway device from a user device, an access request for a first application;

inserting, by the gateway device and according to chaos rules associated with the first application, a header into the access request indicating whether a proxy agent for the first application is to request chaos instructions;

forwarding, by the gateway device, the access request including the header to the proxy agent associated with the first application;

at the proxy agent, responsive to determining from the header that the proxy agent is to request the chaos instructions, sending, to a server, a request requesting instructions from the server regarding whether to inject chaos into the first application, wherein the server reads configuration data associating the first application with a chaos type and a chance value representing a probability that chaos is to be injected, and wherein the server determines, based on the chance value, whether to provide the instructions indicating injection of chaos for the request;

at the proxy agent, receiving the instructions from the server to inject the chaos of the chaos type into the first application; and at the proxy agent, based on the instructions, injecting the chaos of the chaos type into the first application.

14. The system of claim 13, wherein injecting chaos into the first application includes at least one of terminating the first application, generating latency at the first application, and increasing utilization of a computing resource for the first application.

15. The system of claim 13, the stages further comprising:

monitoring a second application to determine whether the second application responds as expected to the chaos injected at the first application; and in an instance where the second application does not respond as expected, generating a notification.

16. The system of claim 15, wherein the second application is monitored based on a determination that the second application will attempt to contact the first application in response to the access request being granted.

17. The system of claim 15, wherein monitoring the second application includes determining whether the second application reattempts to communicate with the first application after a predetermined amount of time.

\* \* \* \* \*